(12) United States Patent
Parness

(10) Patent No.: US 9,049,840 B1
(45) Date of Patent: Jun. 9, 2015

(54) PET TREAT DISPENSING GAME

(71) Applicant: Michael Parness, Foxfield, CO (US)

(72) Inventor: Michael Parness, Foxfield, CO (US)

(73) Assignee: The Kyjen Company, Inc., Centennial, CO (US)

( * ) Notice: Subject to any disclaimer, the term of this patent is extended or adjusted under 35 U.S.C. 154(b) by 0 days.

(21) Appl. No.: 14/537,833

(22) Filed: Nov. 10, 2014

(51) Int. Cl.
*A01K 29/00* (2006.01)
*A01K 5/00* (2006.01)
*A01K 15/02* (2006.01)
*A01K 5/01* (2006.01)

(52) U.S. Cl.
CPC ............... *A01K 5/0114* (2013.01); *A01K 15/02* (2013.01)

(58) Field of Classification Search
CPC ..... A01K 29/00; A01K 15/02; A01K 15/021; A01K 5/01; A01K 5/0114
USPC ............ 119/51.15, 15.02, 702, 707, 712, 905
See application file for complete search history.

(56) References Cited

U.S. PATENT DOCUMENTS

| | | | |
|---|---|---|---|
| 6,651,592 B2 * | 11/2003 | Maddox et al. | 119/720 |
| 7,143,719 B1 | 12/2006 | Giddons | |
| 7,328,671 B2 * | 2/2008 | Kates | 119/720 |
| 7,650,855 B2 * | 1/2010 | Krishnamurthy | 119/51.11 |
| D665,136 S | 8/2012 | Day | |
| 8,307,785 B2 * | 11/2012 | Zimmerman et al. | 119/51.02 |
| 8,578,882 B2 * | 11/2013 | Araujo | 119/51.01 |
| D700,755 S | 3/2014 | Reiss | |
| 8,807,089 B2 * | 8/2014 | Brown et al. | 119/719 |
| 8,944,006 B2 * | 2/2015 | Anderson et al. | 119/51.01 |
| 2003/0019879 A1 * | 1/2003 | Hubicki | 221/15 |
| 2003/0057228 A1 | 3/2003 | Brown et al. | |
| 2005/0224003 A1 * | 10/2005 | Yin et al. | 119/61.5 |
| 2010/0095896 A1 * | 4/2010 | Van Wye | 119/57.92 |
| 2014/0058559 A1 * | 2/2014 | Haynes | 700/232 |
| 2015/0034667 A1 * | 2/2015 | Shimmerlik et al. | 221/90 |

OTHER PUBLICATIONS

Petchatz http://odditymall.com/petchatz-pet-webcam-and-treat-dispenser.
Petco: http://www.petco.com/N_4294965212/Treat-Dispensers.aspx.

* cited by examiner

Primary Examiner — Yvonne Abbott-Lewis

(57) ABSTRACT

The invention relates to a novel pet treat dispenser game wherein a dispenser that resembles a slot machine will dispense treats from one or more slots based upon pet actuation or an RFID signal into a tray for consumption. Release tabs may be lighted as well to aid in the cognitive interaction of the dog and the dispenser game.

8 Claims, 3 Drawing Sheets

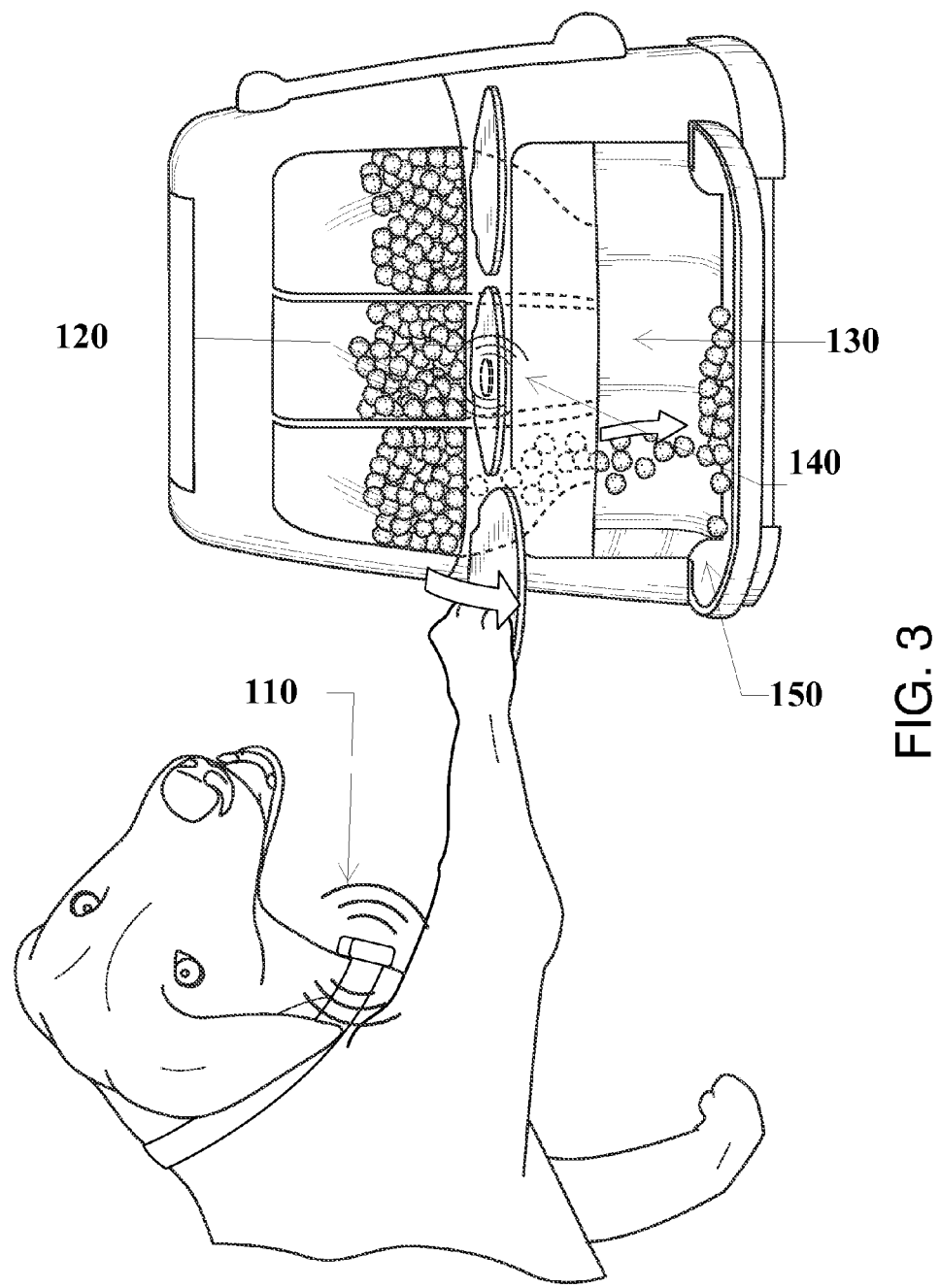

PET TREAT DISPENSING GAME

FIELD

The invention relates to a novel pet treat dispenser game wherein a dispenser that looks like a slot machine will dispense treats from one or more slots based upon pet actuation or an RFID signal into a tray for consumption.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel pet treat dispenser game wherein a dispenser that looks like a slot machine will dispense treats based upon pet actuation or an RFID signal into a tray for consumption.

It is well known in the animal behavior sciences that is a dog doesn't get the mental stimulation it needs it will develop behavior problems such as chewing, biting or elimination in the home due to boredom, stress or depression. Veterinary science has also determined that in addition to behavioral problems, a dog will also be more prone to diseases as the immune system can weaken due to stress or depression. Thus it is key to challenge a dog with activities such as the inventive toy and treat trainer.

THE INVENTION

Summary, Objects and Advantages

All who studied any form of psychology in school remember Pavlov's Dogs. A simple conditioning test resulted in dogs remembering or being cognitive of being given a treat when a bell was rung. Thus the dogs would respond in various cognitive ways when a bell was rung. This behavior presented itself for months after the actual tests were ceased. Pavlov evidenced that dogs actually had memory and the ability to react to certain stimuli on a consistent basis.

The inventive treat dispenser addresses the behavioral triggers which will challenge a dog and reward it when the behavior is repeated.

A dispenser which looks like a Las Vegas slot machine comprises a top opening wherein treats or kibble are inserted. The slot machine has three windows for viewing and a handle which appears to replicate that of a gambling slot machine.

In one embodiment a dog must press one of three tabs to release treats into the corresponding slot, and into the tray below. If a user has only filled one of three slots, the dog must figure out which slot has treats and then to press the corresponding tab.

In another embodiment an RFID collar may be placed on the dog so as to communicate to the treat dispenser when the dog is near enough to the dispenser for signal to be read. A user may set preferences for disposing each time this proximity trigger occurs, or on an intermittent release basis.

In yet another embodiment, the tabs may have small LED lights on them to indicate which slot contains treats, and thus which tab the dog must depress for release of treats into the tray below.

BRIEF DESCRIPTION OF THE DRAWINGS

The invention is described in further detail by reference to three (3) drawings sufficient in detail to describe the invention in which:

FIG. 3 is an illustration of a dog with an RFID collar approaching the dispenser on which one tab contains an RFID receiver.

DETAILED DESCRIPTION, INCLUDING BEST MODES OF CARRYING OUT THE INVENTION

Figure 1:
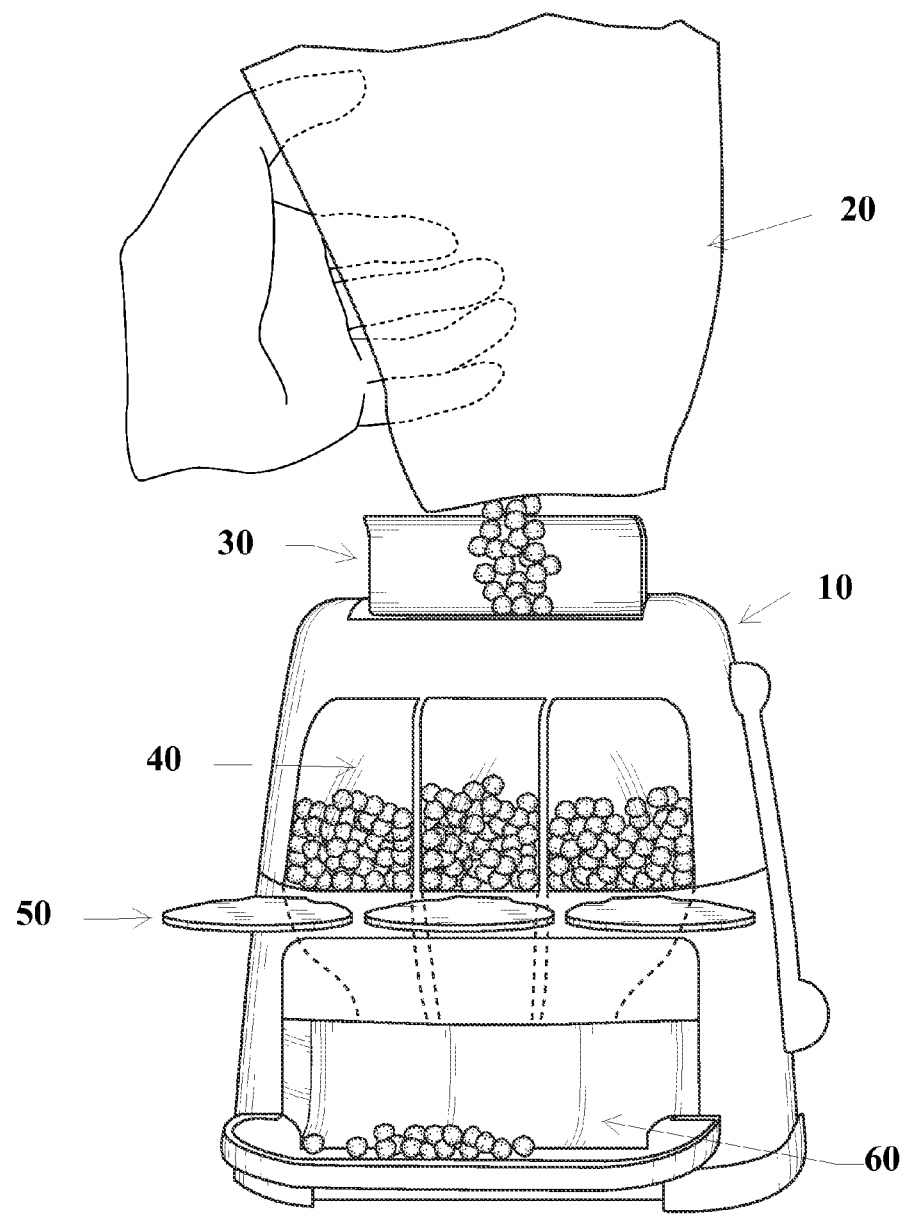
FIG. 1 is a view of the treat dispensing game with a user filling all three slots.

FIG. 1 illustrates the treat dispenser 10 which looks like a Las Vegas style slot machine. A user 20 fills the dispenser with treats or kibble 20 via an opening 30 in the top of the dispenser. The treats are visible through any of the slot windows 40 on the front of the dispenser. Tabs 50 are located on the front of the dispenser and correspond to one of the slots. Treats will dispense into a tray below each slot 60.

Figure 2:
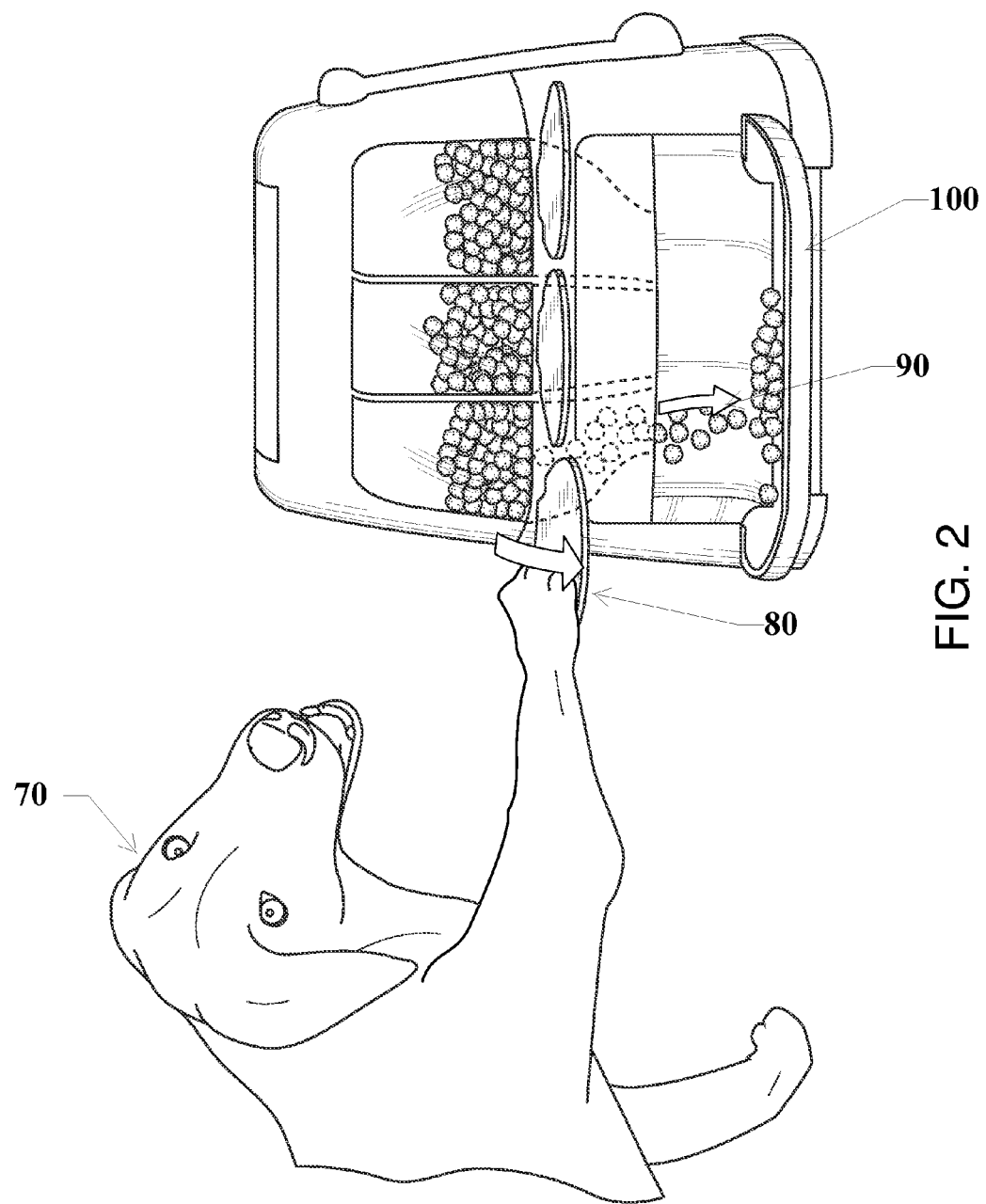
FIG. 2 is an illustration of a dog depressing a tab to obtain release from that slot.

FIG. 2 illustrates a dog 70 actuating one of the tabs 80 which will clear a path for the treats to drop from the slot 90 which is filled with treats. One or more of the slots may be filled. When depressed, the tab opens the slot for treat exit which then flows into the tray 100 at the base of the dispenser for easy consumption.

FIG. 3 illustrates the embodiment using RFID. A dog wears a collar with a transmitter 110 thereupon. When the dog reaches proximity sufficient to transmit, an RFID receiver 120 will activate the slot it corresponds to 130. The tab 140 will move allowing the treats to slide into the tray 150 below. This tab may also have LED lights within to help the dog associate the slot which may contain and dispense treats.

The invention claimed is:

1. A pet treat dispensing game comprising;
   a) a dispenser with slots for treats
   b) tabs for flow or blockage of treats
   c) a receiving tray
   d) an orifice for filling
   e) an RFID receiver located on a tab.

2. A pet treat dispensing game as in claim 1 wherein dispenser is made of hard plastic and contains at least three separated slots wherein treats or kibble will reside.

3. A pet treat dispensing game as in claim 1 wherein protruding tabs are located at the bottom of each slot and will allow for blockage or flow of treats.

4. A pet treat dispensing game as in claim 1 wherein a receiving tray is located below all of the slots so that it receives and holds dispended treats from any or all of the slots.

5. A pet treat dispensing game as in claim 1 wherein an opening resides on top of the dispenser so that a user may insert a desired amount of treats or kibble into the dispenser.

6. A pet treat dispensing game wherein tabs for blocking or release of treats from a separated slot above may contain an LED light within the tab.

7. A pet treat dispensing game as in claim 1 wherein an RFID receiver may be mounted on one or more of the tabs which control a slot to block or release treats into the tray below.

8. A pet treat dispensing game as in claim 1 wherein an RFID transmitter is mounted on an accompanying dog collar and which signals a receiver on a tab on the treat dispenser to move and allow dispensing of treats from a slot above.

* * * * *